[12] United States Patent
Handing et al.

(10) Patent No.: US 10,933,726 B2
(45) Date of Patent: Mar. 2, 2021

(54) BATTERY HOLDER FOR A VEHICLE

(71) Applicant: Benteler Automobiltechnik GmbH, Paderborn (DE)

(72) Inventors: Christian Handing, Langenberg (DE); Tobias Duepmeier, Paderborn (DE); Frank Rabe, Hiddenhausen (DE); Konstantin Tatarinov, Bielefeld (DE); Martin Pohl, Altenbeken (DE); Edvin List Clausen, Løjt Kirkeby Abenra (DK)

(73) Assignee: Benteler Automobiltechnik GmbH, Paderborn (DE)

( * ) Notice: Subject to any disclaimer, the term of this patent is extended or adjusted under 35 U.S.C. 154(b) by 72 days.

(21) Appl. No.: 15/848,920

(22) Filed: Dec. 20, 2017

(65) Prior Publication Data

US 2018/0212216 A1 Jul. 26, 2018

(30) Foreign Application Priority Data

Dec. 23, 2016 (DE) ...................... 10 2016 125 693.5

(51) Int. Cl.
*B60K 1/04* (2019.01)
*H01M 2/10* (2006.01)
*H01M 10/6567* (2014.01)
*H01M 10/6556* (2014.01)
*H01M 10/613* (2014.01)
*H01M 10/625* (2014.01)
*B60K 1/00* (2006.01)

(52) U.S. Cl.
CPC ............ *B60K 1/04* (2013.01); *H01M 2/1072* (2013.01); *H01M 2/1083* (2013.01); *H01M 10/613* (2015.04); *H01M 10/625* (2015.04); *H01M 10/6556* (2015.04); *H01M 10/6567* (2015.04); *B60K 2001/005* (2013.01); *B60Y 2306/01* (2013.01); *H01M 2220/20* (2013.01)

(58) Field of Classification Search
CPC ............ H01M 2/1083; H01M 10/613; H01M 10/625; H01M 10/6556; H01M 10/6567
See application file for complete search history.

(56) References Cited

U.S. PATENT DOCUMENTS

| 2010/0015512 | A1* | 1/2010 | Inoue | H01G 2/04 |
| | | | | 429/99 |
| 2012/0315528 | A1* | 12/2012 | Rajaie | H01M 10/6563 |
| | | | | 429/100 |
| 2015/0044540 | A1* | 2/2015 | Morton | H01M 10/613 |
| | | | | 429/120 |
| 2015/0171485 | A1 | 6/2015 | Rawlinson | |

(Continued)

FOREIGN PATENT DOCUMENTS

DE 10 2010 024 320 A1 12/2011
DE 10 2014 108 160 A1 12/2015

*Primary Examiner* — Jimmy Vo
(74) *Attorney, Agent, or Firm* — Holland & Hart LLP

(57) ABSTRACT

The disclosure comprises a battery holder for receiving at least one electric battery in a vehicle that includes a hollow chamber profile with a hollow chamber that is defined by a base wall and a cover wall, where the electric battery is configured for placement on the cover wall. The battery holder also includes a heat exchanger structure configured for tempering the electric battery, where the heat exchanger structure is formed within a cover wall section of the cover wall and includes at least one hollow channel that intersperses the cover wall.

16 Claims, 12 Drawing Sheets

(56) References Cited

U.S. PATENT DOCUMENTS

2015/0171486 A1\* 6/2015 Rawlinson .......... H01M 10/482
  324/426
2015/0311485 A1   10/2015 Fister et al.

\* cited by examiner

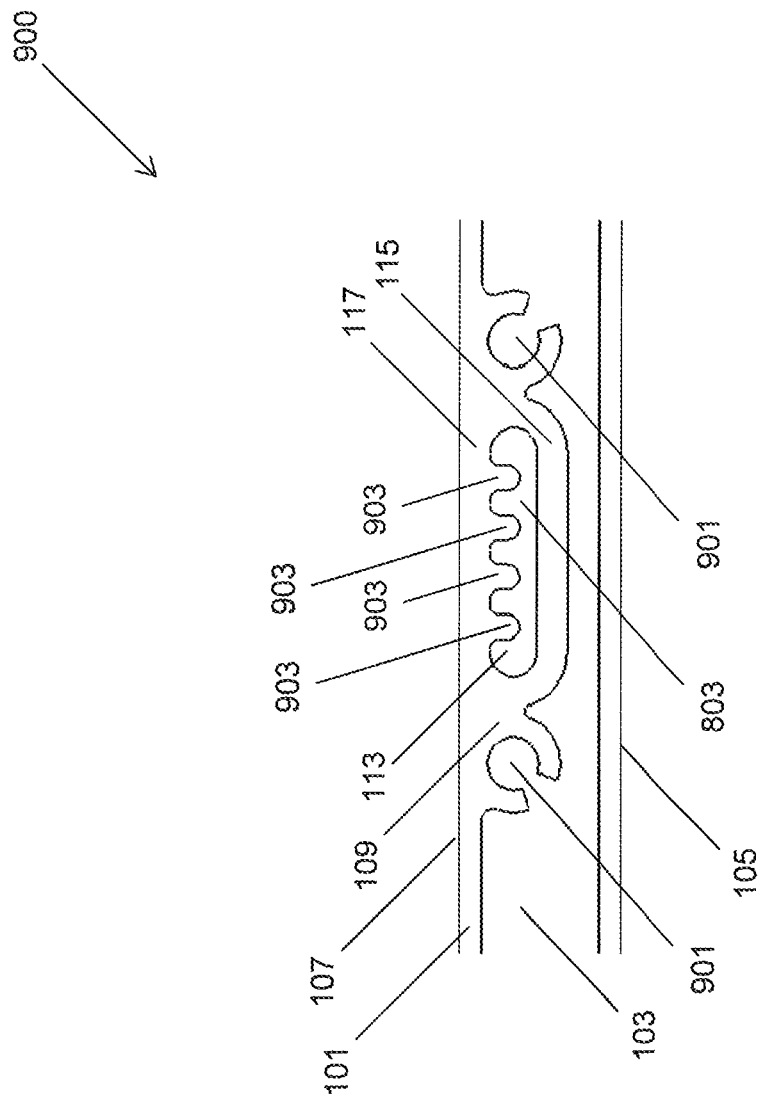

BATTERY HOLDER FOR A VEHICLE

CROSS-REFERENCE TO RELATED APPLICATIONS

This application claims priority to German patent application No. 10 2016 125 693.5, entitled "Batteriehalterung für ein Fahrzeug", and filed on Dec. 23, 2016 by the assignee of this application, the entire disclosure of which is incorporated by reference for all purposes.

BACKGROUND

The present disclosure relates to a battery holder for an electric battery of a vehicle, in particular of an electrically driven vehicle.

For holding an electric battery to provide electric energy in electrically driven vehicle typically battery holders are used, which are disposed between the axles of the vehicle.

For the efficient production of such battery holders profile elements can be used, which are described in the printed document DE 10 2012 100 977 B3.

SUMMARY

It is the object of the present disclosure to provide a further efficient battery holder.

This object is achieved by the features of the independent claims. Advantageous examples are subject of the dependent claims, the description as well as the accompanying figures.

The present disclosure is based on the knowledge that the above object can be solved by a battery holder, which as a functional component comprises an integrated functionality, which exceeds the holding of an electric battery. Such a functionality is the tempering of the electric battery, in particular the cooling and/or heating of the electric battery.

In this way the use of separate functional components can be dispensed with, whereby the production cost can be lowered.

According to a first aspect the disclosure relates to battery holder for the receiving of at least one electric battery in a vehicle, comprising a hollow chamber profile with a hollow chamber that is defined by a base wall and a cover wall, wherein the electric battery is placeable on the cover wall, and comprising a heat exchanger structure for tempering the electric battery, wherein the heat exchanger structure is formed within a cover wall section of the cover wall and comprises at least one hollow channel that intersperses the cover wall.

The hollow channel preferably extends within the cover wall, in particular between the outwards pointing surfaces of the cover wall. In other words the hollow channel comprises a longitudinal axis and intersperses the cover wall in direction of the longitudinal axis of the hollow channel as well as in surface extension direction of the cover wall.

The tempering can comprise cooling and/or heating. Furthermore, the heat exchanger structure can be part of a refrigeration circuit or heat circuit.

In an example the heat exchanger structure comprises a plurality of parallelly extending hollow channels that intersperse the cover wall section, in particular parallelly to the longitudinal axis of the hollow channels. The hollow channels preferably extend in parallel to each other within the cover wall.

The heat exchanger structure can either be provided as a passive element or as an active element. An active implementation of the heat exchanger structure comprises a forced flow of a medium, in particular by a pump or by an artificial generating of a pressure difference. In a passive implementation of the heat exchanger structure the heat exchange primarily takes place by heat conduction and natural convection based on temperature differences of the medium in the hollow channels.

In an example the battery holder comprises a plurality of heat exchanger structures each comprising a plurality of hollow channels which in groups are suitable for tempering an electric battery individually.

In an example the battery holder preferably comprises multiple hollow chamber profiles with a heat exchanger structure.

By penetrating the cover wall section with hollow channels the weight of the battery holder can be reduced in an advantageous manner. Additionally, an increased form rigidity of the battery holder versus mechanical forces, in particular compressive, bending and torsional forces acting on the battery holder can be achieved.

The hollow channels can be formed rotationally symmetric and can have a diameter between, for example, 2 mm and 10 mm. A diameter in this range enables a planar implementation of the cover wall across the whole cover wall of the hollow chamber profile. The hollow channels can extend into the hollow chamber and can have a spacing, in particular an insulation spacing from the base wall.

When the opening of the hollow channel has a diameter, for example, equal to 10 mm, the cover wall can follow the curvature of the opening of the hollow channel in the area of the hollow channel. Furthermore, the hollow channel can be joined to the base wall in the area of the opening of the hollow channel.

The hollow channel typically can have a wall thickness in the range of 0.8 to 3.0 mm. Webs that join the cover respectively base wall with the hollow channels can be disposed between the cover wall and the base wall or between the hollow channel and the cover respectively base wall. In particular, the webs can be reinforcing webs that have a material thickness in the range of 1.5 mm to 3.0 mm.

In particular, the webs can be suitable to increase the heat conduction and/or increase the structural strength of the hollow chamber profile between the cover wall and the base wall or the hollow channel and the cover respectively base wall.

In an example the hollow chamber profile has a height in the range of 10 mm to 15 mm, for example, 13.5 mm. The hollow channels can be configured slot-shaped in cross section and comprise a plurality of webs in the inner surface far from the base wall. The webs can be formed along the longitudinal axis of the hollow channel. The height of the hollow channel can, for example, be between 2 mm and 4 mm and can be reduced at the position of the webs. The inner width of a hollow channel can, for example, be between 10 and 50 mm.

The thickness of the cover wall can be in the range of 1.8 mm to 1.2 mm and the thickness of the base wall can be in the range of 1.8 mm to 4.0 mm. The base wall can have a larger thickness in comparison to the thickness of the cover wall to compensate for relatively higher external actions, for example, penetration of outer parts or gravel impact.

To increase the heat conduction properties webs can be extruded with in the hollow channels. The webs can furthermore support the hollow channels. Thereby, the hollow channels can be arbitrarily disposed in the hollow chambers with regard to height, for example closer to or further spaced apart from the battery.

In an example transverse channels are formed in the cover wall section and fluidly connect the parallelly extending hollow channels to form a meander shaped hollow channel structure, or wherein the parallelly extending hollow channels are defined by openings formed at the front face of the cover wall section and are fluidly connectable by means of pipe couplings that are insertable into the openings.

The pipe couplings can further be complemented or replaced by a tube and/or pipe section. A fluid-tight connection between tube respectively pipe section and pipe couplings can be achieved by a plug connection with the pipe couplings and or an otherwise material- or force-locking connection of pipe couplings and tube respectively pipe.

The opening of the hollow channel are preferably formed on both sides of the cover wall section, such that each hollow channel extends between two openings and thereby is accessible laterally, or at the front face of the hollow chamber profile.

In an example it is provided, that the openings of the hollow channels are mutually connected by a fluid-carrying connection to fluidly connect adjacent hollow channels in series or in parallel. It can also be provided, that every second hollow channel is mutually connected by a fluid-carrying connection. The connected hollow channels can form a fluid interconnection, for example, to form a continuous fluid interconnection with an enlarged surface, especially for the heat exchange.

The battery holder can be sealable in a fluid-tight, especially gas-tight or water-tight manner. The fluid-tight seal can be done with a led, which can be integrally connected to the battery holder. Thereby, a separate circuit, for example with a base cooling system for the tempering of the electric battery arises, so that effect of external influences, like, for example, ambient temperature, atmospheric pressure or humidity can be reduced. Multiple hollow chamber profiles of the battery holder and/or the cover, which can comprise a frame circumferentially defining the battery/batteries, can be joined in a fluid-tight manner by friction stir welding.

In an example each hollow channel is interspersable with a fluid, in particular a heat conducting fluid, to temper, especially cool or heat, at least one electric battery. The fluid can further be a cooling fluid or a heating fluid.

A heat transport between the battery holder and the fluid takes place with a temperature difference between fluid and battery holder, so that a high heat capacity of the fluid can be advantageous. Furthermore, a high heat conductivity of the fluid enables an efficient transmitting of heat between the battery holder and the fluid and thereby an efficient tempering.

In an example the at least one hollow channel of the cover wall section is defined by a first wall that is facing the base wall, and a second wall that is facing the electric battery, wherein the second wall has a greater wall thickness than the first wall to achieve a homogeneous temperature curve in the cover wall section.

With an, in particular electrolytic electric battery, which, for example, is composed of multiple cells, the power of the electric battery depends on the temperature of the battery. With a homogeneous temperature potential differences between the single cells of the electric battery can be avoided and thereby it can be ensured, that the electric battery can be operated safely and efficiently.

In an example the cover wall section has a greater wall thickness than the base wall. In this example an underrun protection can be ensured, for example, by an additional separate protection element under the base wall.

The base wall can advantageously be configured for the structural reinforcement of the battery holder and/or the holder in the vehicle and does not need to be configured for the receiving of hollow channels, so that the material thickness of the base wall can be advantageously reduced.

It is furthermore possible that the base wall sectionally comprises a structure for the absorption of deformation energy, for example, during an impact, in particular a side impact of the vehicle. This structure can, in particular, be realized in the form of fins, corrugations or rigidity reducing sections.

In an example the battery holder comprises at least one web that extends within the hollow chamber and joins the base wall with the cover wall. The web can serve the structural reinforcement of the battery holder, so that forces acting on, in particular the cover wall and the base wall can be absorbed.

In an example the web joins the base wall and the cover wall along a vertical or wherein the web is disposed perpendicular to the base wall or perpendicular to the cover wall, or wherein the web is disposed angular, in particular slanting, with respect to the base wall or the cover wall.

In an example each web is formed curved in the cross section.

Generally, the form and placement of the webs between the cover wall and the base wall is designed to realize an advantageous absorption of impacts, vibrations and or static loads that act on the battery holder. In case of an impact the absorption of the impact energy can be achieved by elastic or plastic deformation of the base wall and/or the webs to cushion the impact and avoid damaging the electric battery. Thereby, in particular the safe operation of the electric battery in the battery holder, which, for example, is disposed or mounted in a vehicle, can be enabled.

A curved cross sectional form of the web can advantageously modify the elasticity of the web, so that a better absorption, in particular, dampened suspension of dynamically acting forces, for example, vibrations or shocks but also when undercutting boller or gravel impact onto the base wall, can be ensured. In this way, increased protection of the battery/batteries can be achieved.

Comparable advantages can be realized by an inclined arranging of the at least one web between the cover wall and the base wall.

In an example the base wall is formed as an underrun protection plate. Thereby, the base wall has an additional protection effect at the underside of the vehicle for the electric battery in the battery holder.

In an example each web is heat conducting and forms a passive heat sink.

The battery holder can be mounted longitudinally or transversely between the axles of the vehicle. An arranging of the battery holder between a forward or backward longitudinal beam in the front or in the back of a motor vehicle is also conceivable.

The hollow chamber profile of the battery holder, including the base wall, the cover wall and the webs are preferably made from a material with good heat conductivity. Materials with good heat conductivity in particular are electrically conductive solids, for example metals. The heat conduction from the cover wall to the base wall via the at least one web can be used to support the tempering by the hollow channels. The heat conduction between the cover wall and the base wall can also be realized by increasing the thermal conductivity of the medium of the hollow chamber. For example, the hollow chamber can be filled with a heat conducting fluid or the relative humidity in the hollow chamber, which is filled with a gas, can be increased. The hollow chamber is, in particular, made from an extruded aluminum profile.

In an example each web divides the hollow chamber in two partial hollow chambers.

In an example the battery holder comprises a further hollow chamber profile with a further hollow chamber that is defined by a further base wall and a further cover wall, wherein a further electric battery is placeable on the cover wall, wherein a further heat exchanger structure for tempering the further electric battery is formed within a further cover wall section of the further cover wall, wherein the further heat exchanger structure comprises a further hollow channel that intersperses the further cover wall; and wherein the hollow chamber profile and the further hollow chamber profile are interconnected, in particular interconnected integrally and/or in a formfitting manner.

In an example the heat exchanger structure forms a evaporator or a condenser. The evaporator respectively the condenser is distinguished by an increased heat capacity and a more efficient heat absorption by a change of state of aggregation of the medium in the hollow channels. This can be advantageous for the tempering of an electric battery.

In an example each hollow channel forms a fluid-carrying conduit.

In an example each hollow channel has a circular cross section or a slot-shaped cross section with a longitudinal axis extending within the cover wall.

The geometric form of each hollow channel defines the area available to the heat exchanger structure for the heat transport between the heat exchanger structure and the cooling or heating fluid respectively gas interspersing the hollow channels. The larger the summed-up total surface area of the hollow channels, the more heat can be dissipated or supplied by otherwise similar parameters of the electric battery.

In an example fastening tabs for the coupling with a further hollow chamber profile are laterally disposed of the hollow chamber profile.

The fastening tabs can be formed in such a way that the fastening tabs engage in a receptacle for the battery holder, in particular in a vehicle in a form-fitting manner. Thereby, the form-fitting connection of the battery holder and the battery holder receptacle can also be expanded, so that a release of the positive-locking connection between the fastening tab and the battery holder receptacle can be advantageously hampered. Moreover, multiple hollow chamber profiles can be form-fittingly interconnected with the fastening tabs and/or integrally joined by welding or gluing.

In an example the battery holder comprises a side hollow chamber profile that laterally connects to the hollow chamber profile and is disposed perpendicular to the hollow chamber profile, in particular formed integrally with the hollow chamber profile.

In an example each hollow chamber profile is an extruded profile.

In particular, the extruded profile or extrusion profile is integrally formed. Thereby, the hollow chamber profile can be realized by a light metal profile.

In an example the hollow channels comprise circular cross section and extend within the cover wall section and thereby form pipe-like fluid conduits that can be extruded with the hollow chamber profile.

To statically and dynamically reinforce the hollow chamber profile the webs can be extruded with. Thereby, the hollow chamber can be divided in multiple partial hollow chambers and the base wall can be structurally joined to the cover wall.

BRIEF DESCRIPTION OF THE DRAWINGS

Additional exemplary examples are described with regard to the accompanying figurers.

FIGS. 8B and 9 show a cross section of a hollow chamber profile and a hollow channel.

DETAILED DESCRIPTION OF THE DRAWINGS

Figure 1:
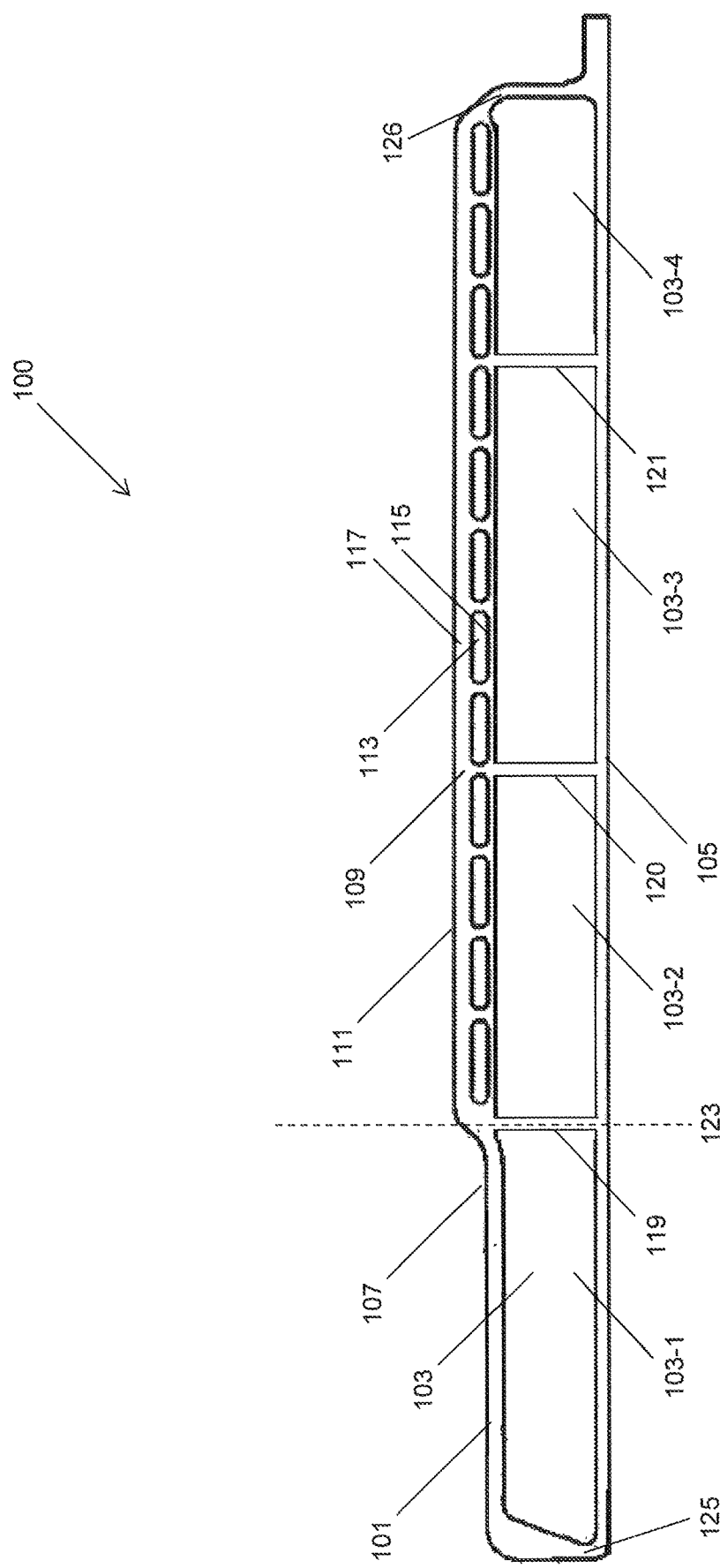
FIGS. 1-7 show cross sections of a schematic representation of a battery holder.

FIG. 1 shows a cross section of a schematic representation of the battery holder 100. The section plane is disposed transverse to the longitudinal axis of the hollow channel 113. The battery holder 100 is configured to receive at least one electric battery in the vehicle, comprising a hollow chamber profile 101 with a hollow chamber 103, which is defined by a base wall 105 and a cover wall 107, wherein the electric battery is placeable on the cover wall 107, and a heat exchanger structure 109 for tempering the electric battery, wherein the heat exchanger structure 109 is formed within a cover wall section 111 of the cover wall 107 and comprises at least one hollow channel 113, which intersperses the cover wall 107.

The heat exchanger structure comprises a plurality of parallelly extending hollow channels 113, which intersperse the cover wall section 111. The hollow channels 113 are defined by a first wall 115, which is facing the base wall 105, and a second wall 117, which is facing the electric battery, wherein the second wall 117 has a greater wall thickness than the first wall 115 and acts as a heat reservoir to equalize the temperature distribution over the surface.

A web 119, which extends within the hollow chamber 103, joins the base wall 105 with the cover wall 107. The web 119 joins the base wall 105 and the cover wall 107 along a vertical 123. The web 119 is disposed perpendicular to the base wall 105 and perpendicular to the cover wall 107. The web 119 divides the hollow chamber 103 into two partial hollow chambers 103-1, 103-2. The hollow chamber profile 101 is in particular a laterally closed, continuous profile with two side wall 125, 126.

In an example the battery holder comprises in total three webs 119, 120, 121 parallel to the vertical 123, which together with the sidewalls 125, 126 divide the hollow chamber 103 into a total 4 hollow chambers 103-1, 103-2, 103-3, 103-4.

In an example the cover wall section 111 is supported by a web respectively a sidewall at the junctions to the cover wall 107. As shown in FIG. 1 the reinforcement can be realized by the web 119 and the sidewall 126 to absorb the forces resulting from the weight of the batteries.

In an example the hollow channels have a rounded in particular slot-shaped cross section.

Figure 2:
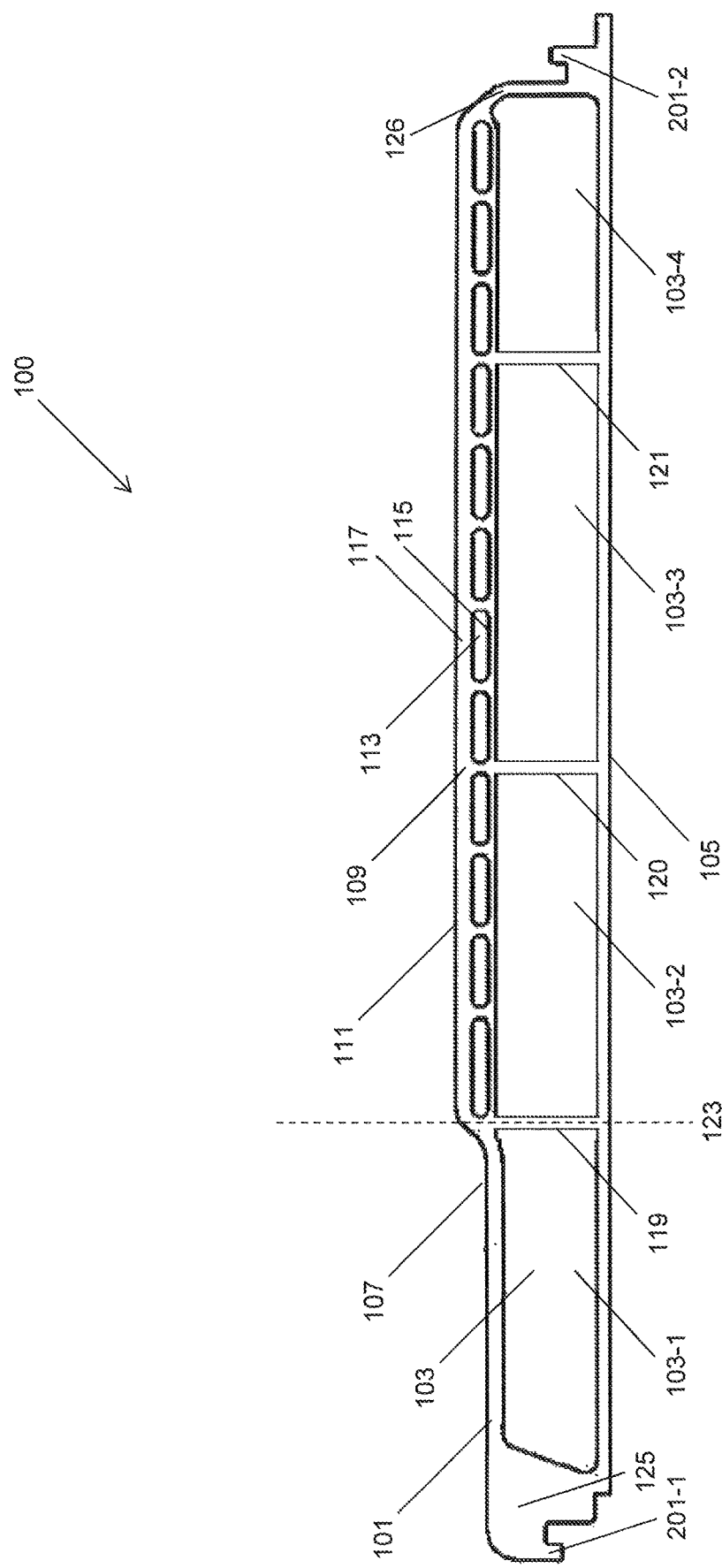

FIG. 2 shows a cross section of a schematic representation of the battery holder 100, which in particular fastening tabs 201-1, 201-2 for the form-fitting coupling with further hollow chamber profiles 101 of the battery holder 100.

Figure 3:
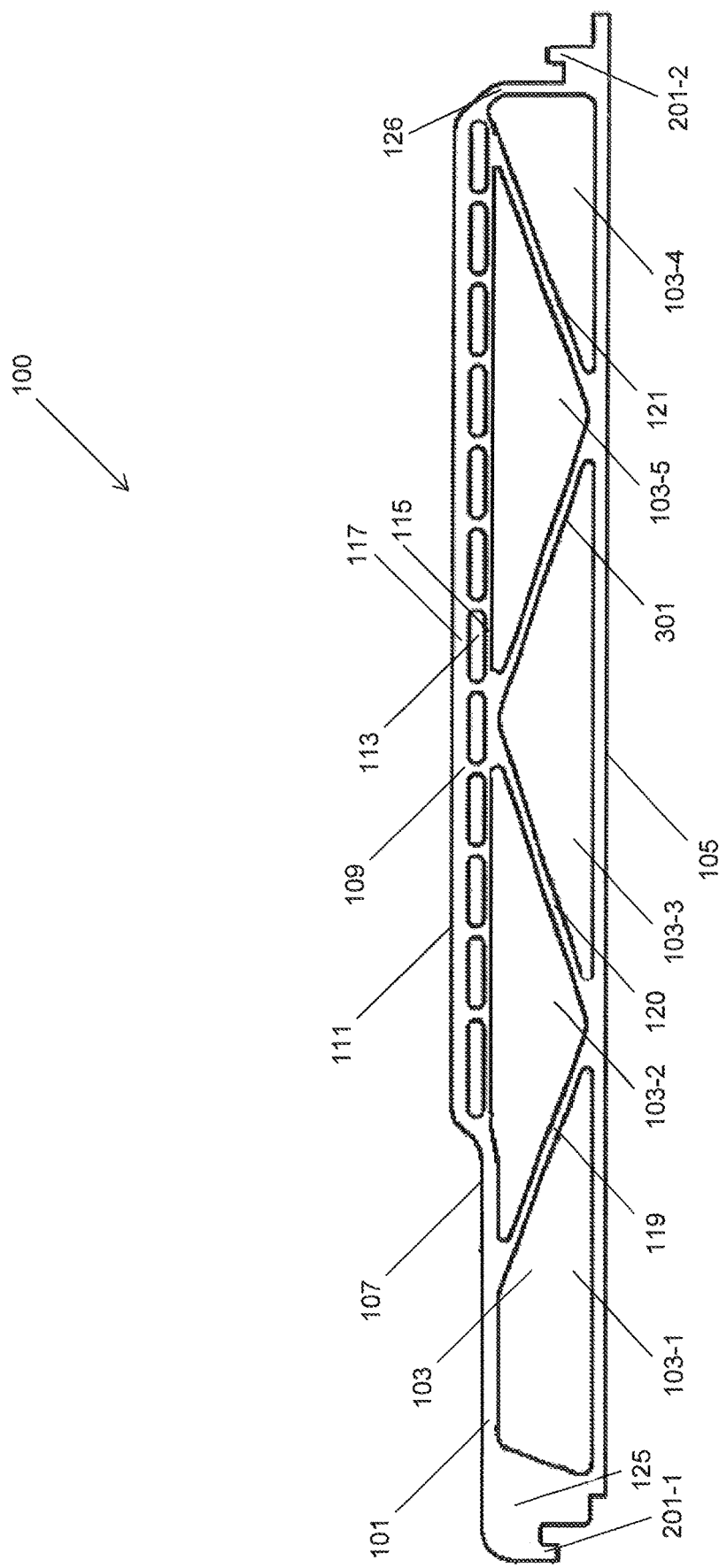

FIG. 3 shows a cross section of a schematic representation of the battery holder 100, where in respect to FIG. 2 the webs 119, 120, 121 are supplemented by a further web 301. Thereby, the webs 119, 120, 121 and 301 divide the hollow chamber 103 into 5 partial hollow chambers 103-1, 103-2, 103-3, 103-4, 103-5. In addition, in this exemplary example the webs 119, 120, 121 and 301 are not disposed in parallel to the vertical 123 but mutually angled. In particular the partial hollow chambers 103-2, 103-3, 103-4, 103-5 are shaped triangularly by the arrangement of the webs 119, 120, 121 and 301. The section plane of the representation is disposed transverse to the longitudinal direction of the hollow channels 113.

With the slanted arrangement of the webs 119, 120, 121 and 301 an advantageous load distribution within the battery holder can be realized. In particular forces acting on the cover wall 107 and the base wall 105 can be absorbed efficiently by the arrangement of the webs 119, 120, 121 and 301 shown in FIG. 3.

A slanted arrangement of the webs 119, 120, 121 and 301 can in particular deflect and thereby distribute onto the whole structure of the battery holder forces acting on the base wall 105 and the cover wall 107 along the longitudinal axis of the battery holder.

Figure 4:
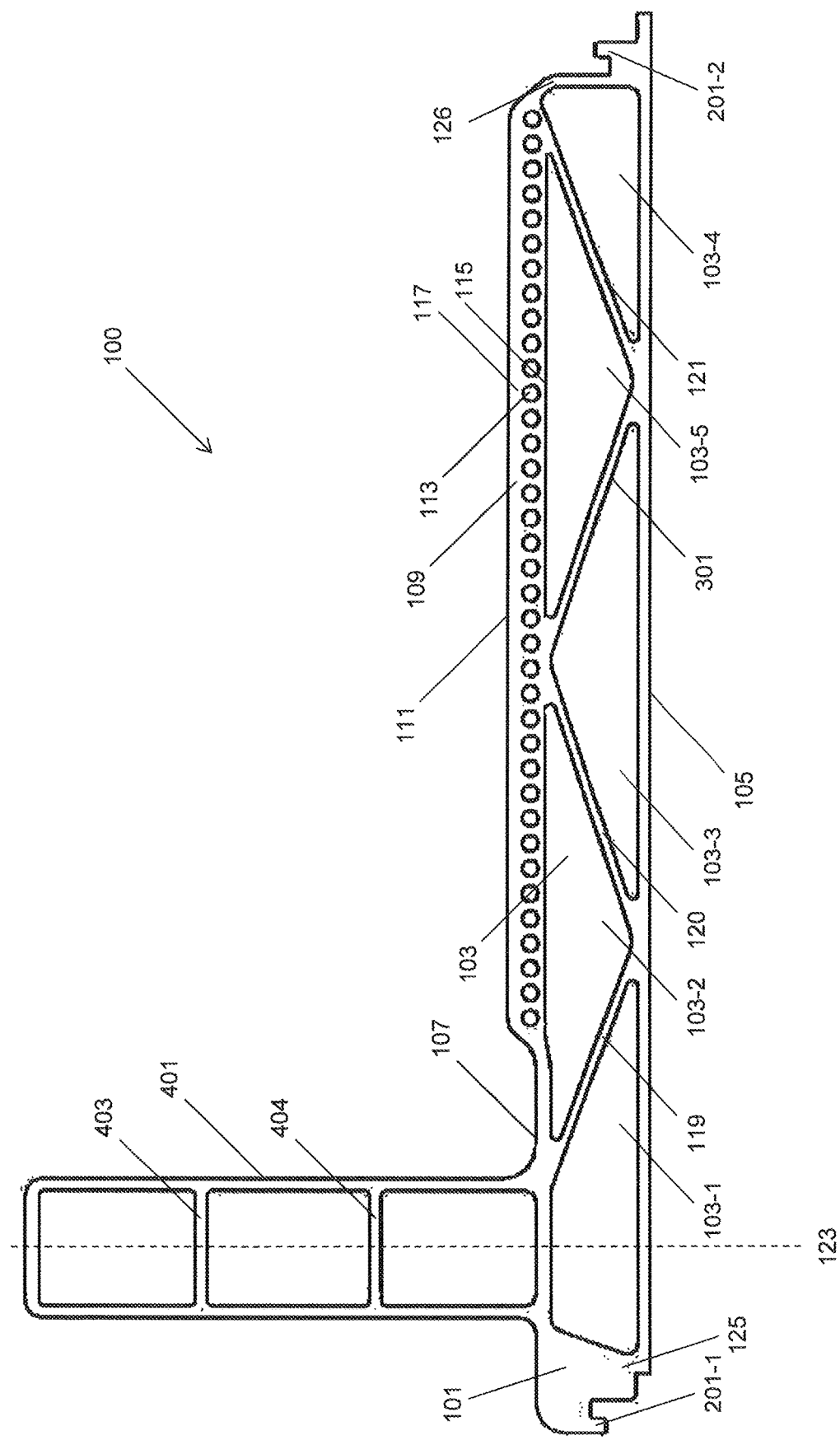

FIG. 4 shows a cross section of a schematic representation of the battery holder 100 according to an example, wherein in addition to the representation in FIG. 3 a side hollow chamber profile 401 is disposed, which joins laterally to the hollow chamber profile 101 and is disposed perpendicular to the hollow chamber profile 101, in particular formed integrally with the hollow chamber profile 101.

In an example the side hollow chamber profile 401 is reinforced by webs 403, 404. FIG. 4 shows an example of the side hollow chamber profile 401, wherein the width of the side hollow chamber profile 401 approximately matches the height of the hollow chamber profile 101 in the direction of the vertical 123.

In an example the height of the side hollow chamber profile 401 along the vertical 123 approximately matches half the length of the hollow chamber profile 101 transverse to the vertical 123.

In an example the side hollow chamber profile 401 is joined to the hollow chamber profile 101 at the cover wall 107, but in particular not with the cover wall section 111, comprising the heat exchanger structure.

The side hollow chamber profile 401 serves as a partition wall respectively sidewall in the battery holder, which separates adjacent batteries, but also contributes to the reinforcement and stiffening of the battery holder 100.

In the example shown in FIG. 4 the hollow channels 113 have a circular cross section with a longitudinal axis extending within the cover wall section 111. Thereby, in comparison to a slot-shaped cross section of the hollow channels 103 according to FIGS. 1, 2 and 3, wherein the longitudinal axis of the slot extends transverse to the longitudinal axis of the hollow channels, a larger number of hollow channels 113 can be formed in the cover wall section 111. This applies with constant thickness and length of the cover wall section 111 and height of the hollow channels 113 along the vertical 123.

Figure 5:
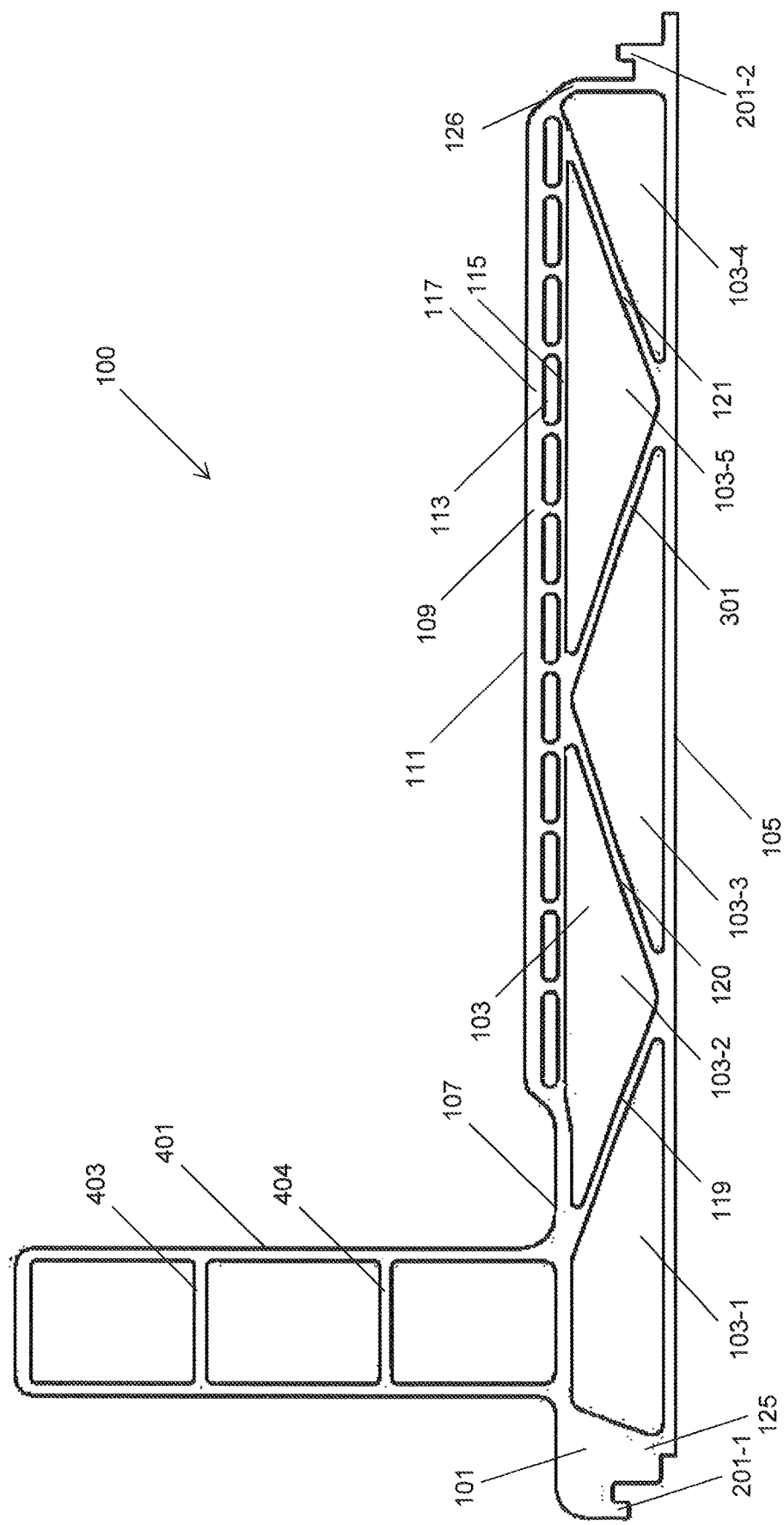

FIG. 5 shows a cross section of a schematic representation of the battery holder 100 according to an example, wherein to the representation in FIG. 3 a side hollow chamber profile 401 is disposed, which laterally interfaces with the hollow chamber profile 101 and is disposed perpendicular to the hollow chamber profile 101, in particular integrally formed with the hollow chamber profile 101. The section plane of the representation is transverse to the longitudinal alignment of the hollow channels 113.

The hollow channels 113, as shown in FIGS. 1, 2, 3 and 5 are formed slot-shaped. Through this form of the hollow channels 113, the cross section area, summed up over the hollow channels 113, can be advantageously enlarged compared to a circular form by using as a lower number of separating webs between the hollow channels 113. An enlarged total cross section area of the hollow channels 113 achieves the advantage that the heat exchanger structure 109 comprises a larger surface area for the heat transport between the heat exchanger structure 109 and the medium in the hollow channels 113. Simultaneously, the fluid volume that can circulate through the hollow channels 113 and thereby weight can be reduced.

Figure 6:
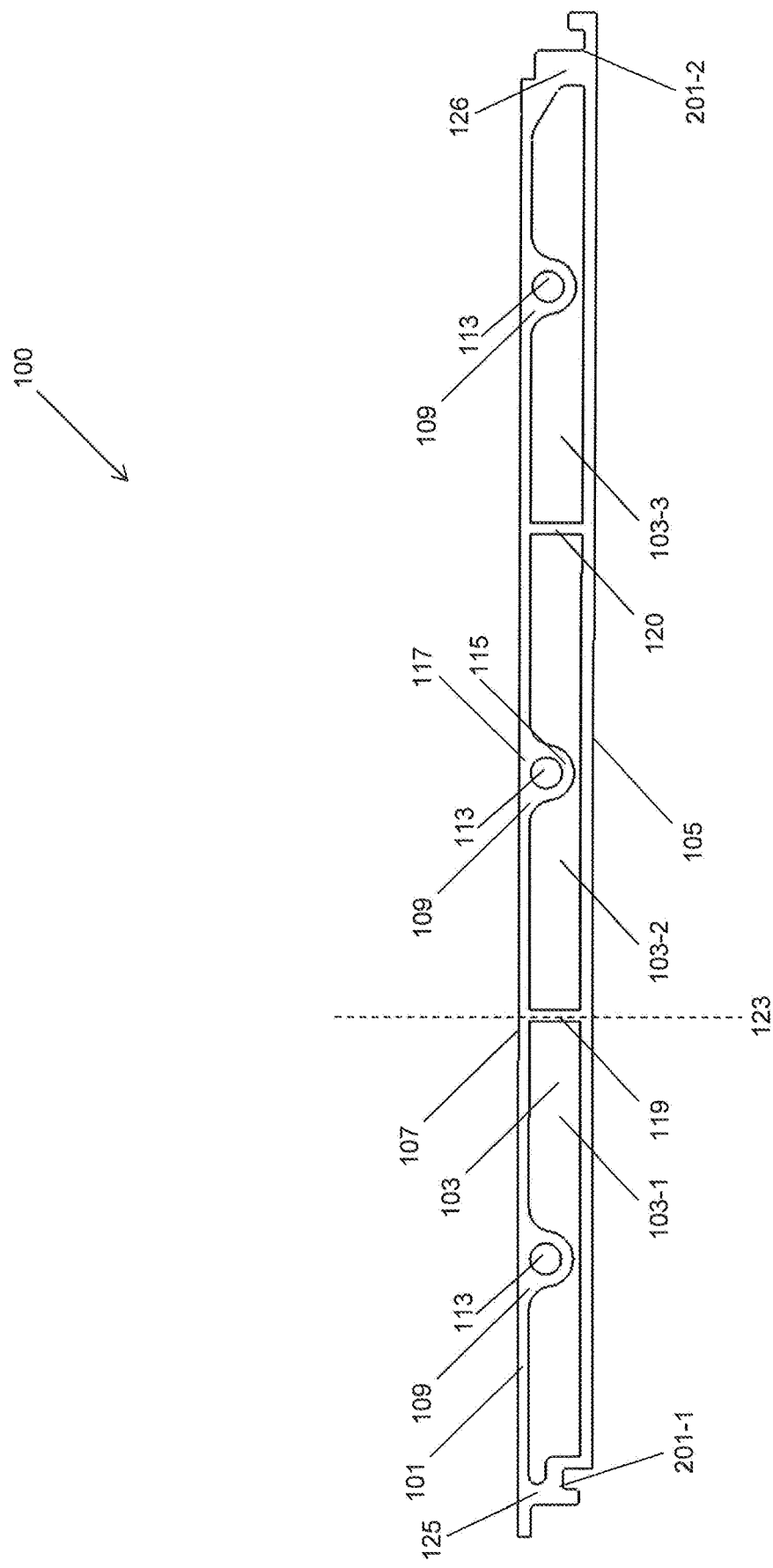

FIG. 6 shows a cross section of a schematic representation of the battery holder 100, which comprises in particular a distributed heat exchanger structure 109. A hollow channel 113 is arranged in each case in the partial hollow chamber 103-1, 103-2 respectively 103-3. The hollow channels 113 have a circular cross section area, wherein the second, in the drawing plane lower wall 117, which defines the hollow channel 113 follows the cross section of the hollow channel 113 and accordingly is also circularly shaped. The section plane of the representation is transverse to the longitudinal alignment of the hollow channels 113.

With respect to the examples shown in FIGS. 1 to 5 an equally as large total cross section area of the hollow channels 113 can be achieved by a correspondingly larger cross section of the hollow channels 113 extending into the partial hollow chambers 103-1, 103-2 and 103-3.

Figure 7:
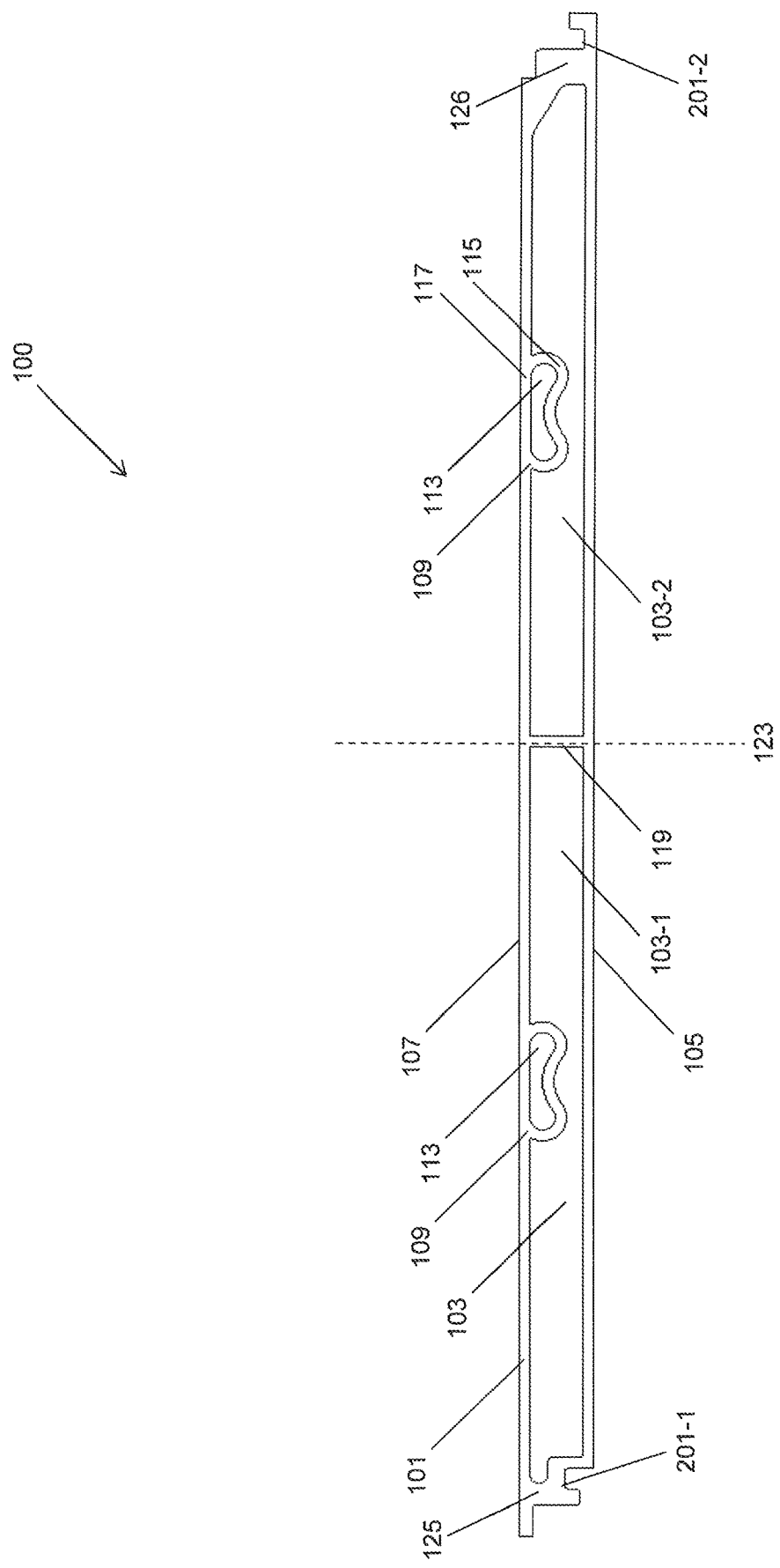

FIG. 7 shows a cross section of a schematic representation of the battery holder 100, which comprises in particular a distributed heat exchanger structure 109. The hollow channels 113 of the distributed heat exchanger structure 109 are disposed at a greater distance compared to the examples shown in FIGS. 1 to 5. One hollow channel 113 is in each case disposed in a partial hollow chamber 103-1 respectively 103-2. The hollow channels 113 have a complexly rounded cross sectional area, wherein the second wall 117, which defines the hollow channel 113, follows the cross section of the hollow channel 113 and accordingly is also formed complexly rounded. The section plane of the representation is transverse to the longitudinal alignment of the hollow channels 113.

Figure 8A:
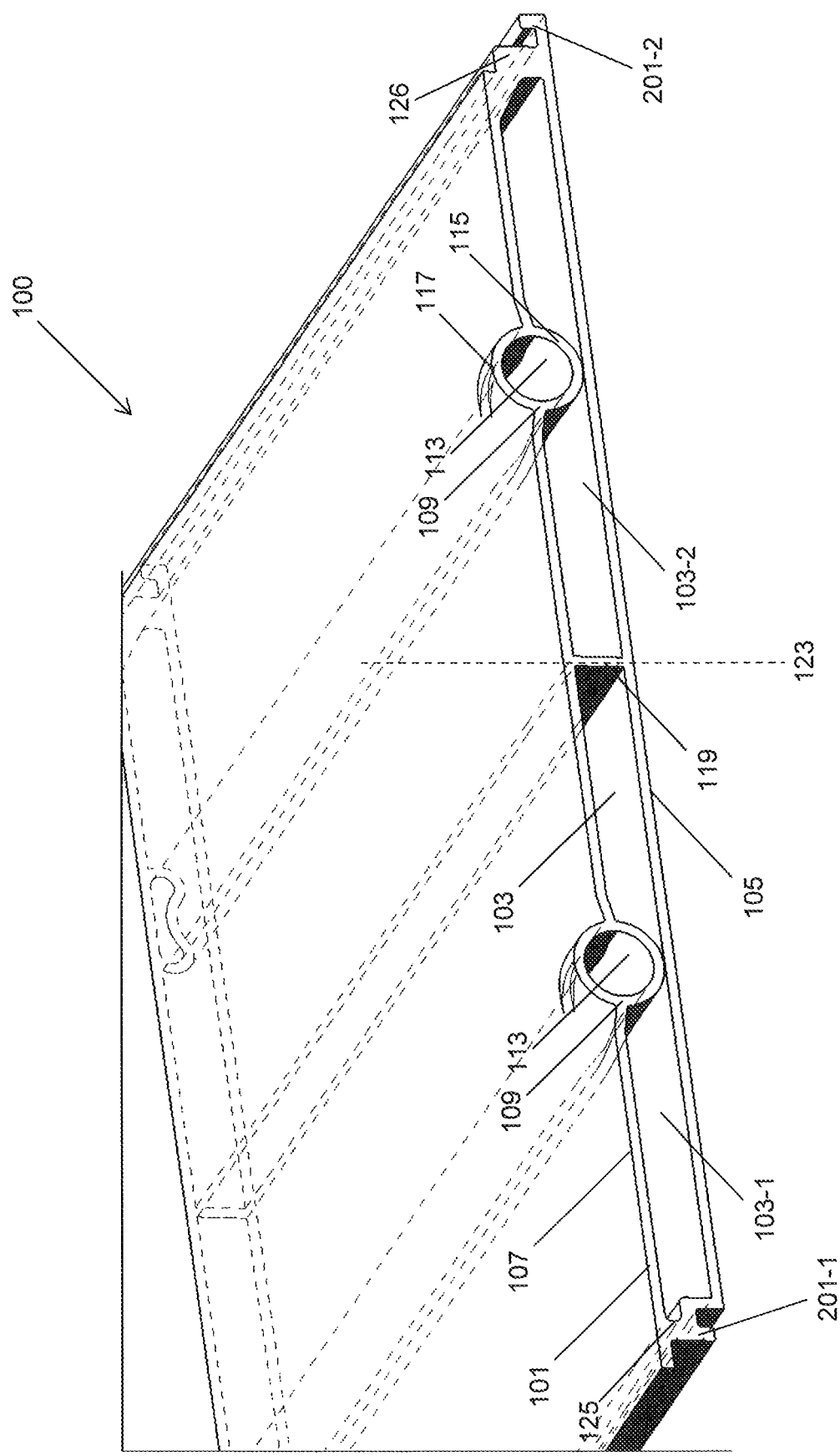
FIG. 8A shows a perspective representation of the batter holder.

FIG. 8A shows a perspective representation of the battery holder 100 according to FIG. 7. The openings of the hollow channels 113 have a circular cross sectional area, wherein the first wall 115 and the second wall 117, which define the hollow channel 113, follow the cross section of the opening of the hollow channel 113 at the front face of the battery holder 100 and accordingly are also formed circular. With the circular form of the first wall the planar profile of the cover wall 107 is interspersed by a rounding of the hollow channels 113.

In an example the hollow channel 113 comprises a continually changing cross section along its longitudinal axis. A transformation of the circular cross section to the complexly rounded cross section according to the example shown in FIG. 7 is effected in particular in the first section of the hollow channel 113 along its longitudinal axis. After this first section results a planar profile of the cover wall 107.

This type of complex forming of the hollow channel opening enables a combination of the circular hollow channel opening cross section with the complexly formed cross section of the hollow channels 113. A circular cross section of the hollow channel opening is especially advantageous for the receiving of or connecting to a pipe conduit, a tube or a screw-in or plug-in connector. By contrast, a complexly formed cross section of the hollow channels 113 can be advantageous for the heat transport between the hollow chamber profile 101 and the medium in the hollow channels 113 as well as regarding the weight of battery holder 100. By combining the cross section forms both previously stated advantages can be combined.

The circular, especially rotationally symmetric opening of the hollow channel can advantageously be used for connecting a connection element, especially a connecting piece of a tube or pipe. Thereby, an in particular sealed connection can be realized, for example, by Insertion of a seal between the hollow channel 113 and the connection element.

Figure 8B:
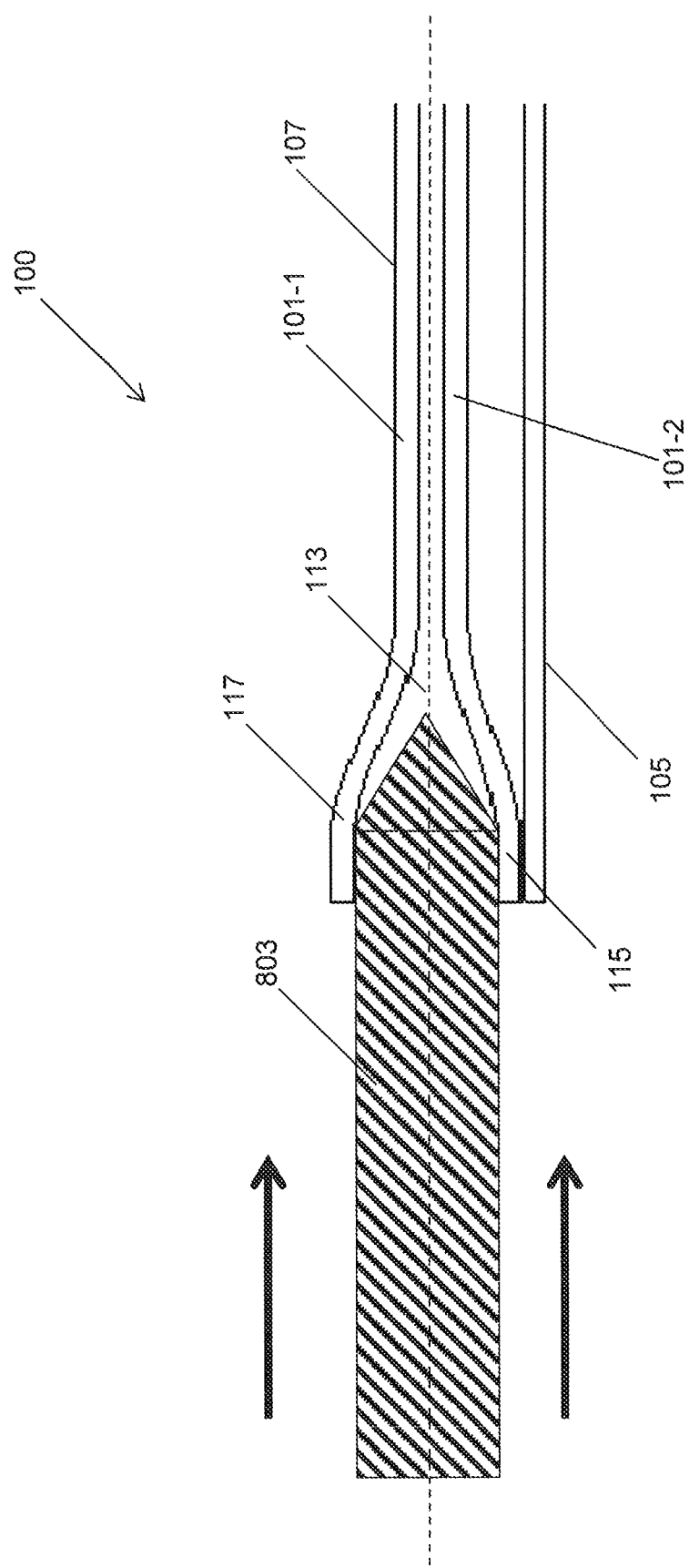

FIG. 8B shows a cross section of the hollow chamber profile 101 and the hollow channel 113 according to an example shown in FIG. 8A. The section plane of the representation is parallel to the longitudinal alignment of the hollow channels 113. The opening of the hollow channel 113 has a circular cross section, which in a first section of the hollow channel 113 along the longitudinal axis 801 of the hollow channel is formed into a complexly shaped cross sectional area according to the example shown in FIG. 8A.

Furthermore, FIG. 8B shows an, especially circular molding tool 803, which in a method intersperses and plastically deforms the first section of the hollow channel 113. In particular, a circular cross section of the opening of the hollow channel 113 is formed, which in the first section of the hollow channel 113 continually transitions into the original cross sectional form of the hollow channel 113.

In an example the first wall 115 of the cover wall 107 is joined with the base wall 105. Thereby, the hollow channel 113 is defined by the base wall 105. However, it is also possible that the base wall 105 and the first wall 115 are spaced apart from each other.

FIG. 9 shows a cross section 900 of a hollow chamber profile 101 comprising a hollow channel 113, wherein the second wall 117 comprises a plurality of webs 903 on the hollow channel side, which are formed in longitudinal orientation of the hollow channel 113 and protrude into the hollow channel 113. This form of the hollow channel 113 according to the examples shown in FIG. 6, 7 or 8A relates to a battery holder comprising a distributed heat exchanger structure 109, which comprises hollow channels 113, which are spaced apart from each other.

The hollow channels 113 comprise a slot-shaped cross section and in each case laterally comprise an additional hollow channel 901, which in the circumference comprises an aperture, which can extend in the direction of the longitudinal axis of the hollow channel 113 across the entire hollow chamber profile 101.

In an example the additional hollow channels 901 form axial bolting points for mounting a fluid collector. The fluid collector can be connected to the battery holder 100 respectively to the hollow chamber profile 101 by screw connections in the additional hollow channel 901, so that an, especially fluid-tight connection between the hollow channel 113 and the fluid collector is formed.

The additional hollow channel 901 form a structure at the hollow channel 113, which additionally reinforces the hollow chamber profile 101.

The contact surface between the medium in the hollow channels 113 and the hollow chamber profile 101 is enlarged by the webs 903, so that the surface, which is available for the heat exchange between the hollow chamber profile 101 and the medium in the hollow channel 113, is advantageously enlarged. Additional complex forms of the first wall 115, which can further enlarge the surface, are possible.

The webs 903 can be extruded with the hollow chamber profile 101 in an alloy of higher strength, so that an advantageous simultaneous fabrication of the hollow chamber profile 101 is possible and the assembly effort for the completion of the battery holder 100 can be reduced.

There can be a gap, especially an insulation gap between the first wall 115 and the base wall 105. Thereby, the heat exchanger structure 109 comprising distributed or areal distribution of the hollow channels 113 can be insulated from the base wall, in particular thermally insulated.

The heat exchanger structure 109 comprising a plurality of smaller hollow channels 113 according to the examples shown in FIGS. 1 to 5 can be integrally extruded, so that also these examples of the battery holder 100 can be produced with an advantageous reduction in production time for the battery holder 100. Preferably, the hollow chamber profile 101 is integrally formed together with the heat exchanger structure 109 and the hollow channel 113, in particular formed by extrusion.

Figure 10:
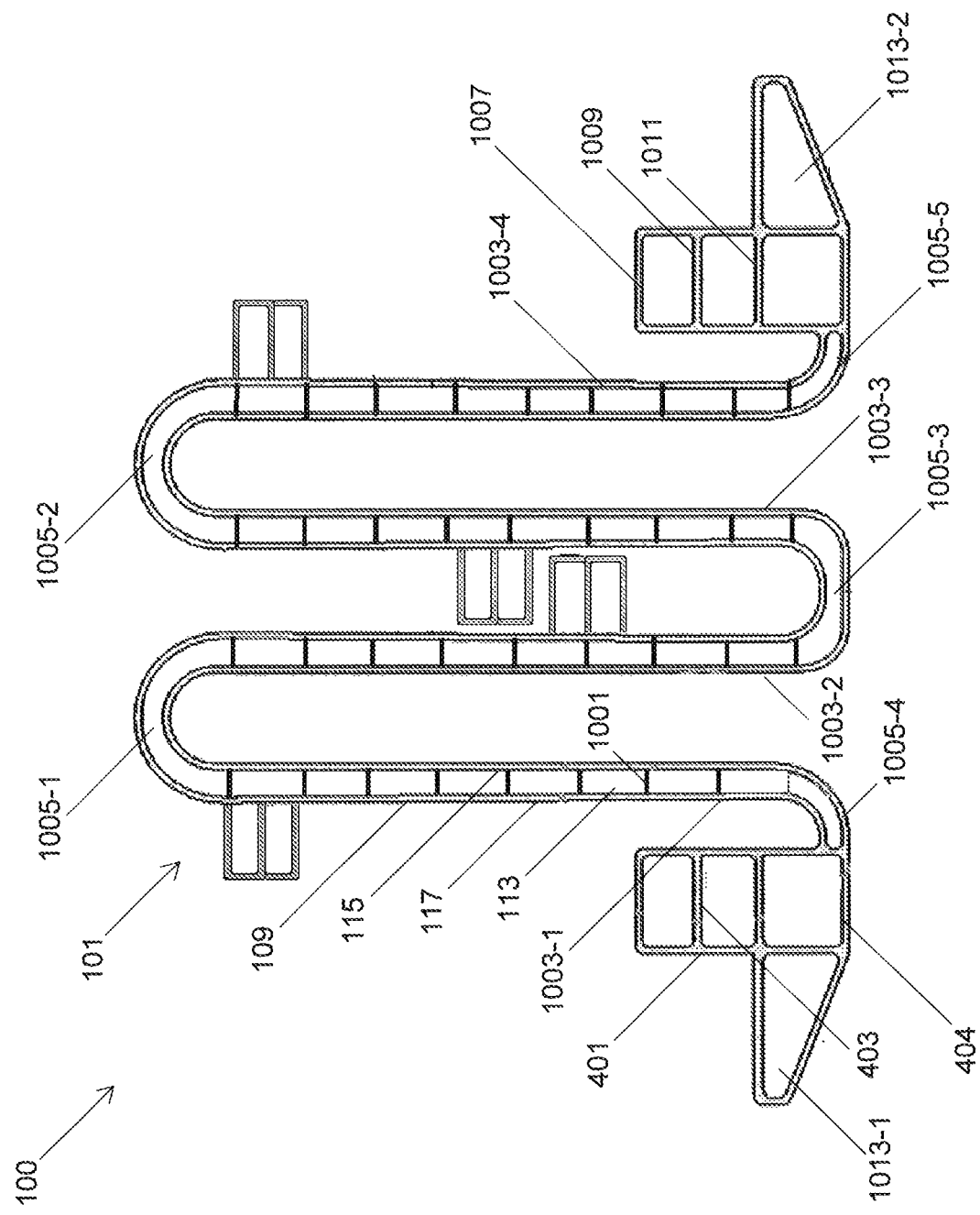
FIG. 10 shows a cross section of a battery holder.

FIG. 10 shows a cross sectional view of a schematic drawing of the battery holder 100. The section plane is disposed transverse to the longitudinal axis of the hollow channel 113. The battery holder 100 comprises a hollow chamber profile 101 with a heat exchanger structure 109. The heat exchanger structure 109 comprises a plurality of hollow channels 113, which extend in parallel to one another and are defined by the first wall 115 and the second wall 117. The hollow channels 113 comprise a rectangular cross sectional area and are separated by rectilinear webs 1001, which connect the first wall 115 and the second wall 117.

The hollow chamber profile 101 can have a meandering form comprising bent sections 1005-1, 1005-2, 1005-3, 1005-4 and straight sections 1003-1, 1003-2, 1003-3, 1003-4. The height of the rectilinear webs 1001 defines the distance between the first wall 115 and the second wall 117. The bent sections 1005-1, 1005-2, 1005-3, 1005-4, 1005-5 can be pulled apart to achieve a planar battery holder 100. In particular the example shown in FIG. 10 is the extruded form of the battery holder 100. In a further process step the battery holder 100 can be pulled apart to yield the planar profile wall 103 according to the example shown in FIG. 11.

Furthermore, the battery holder 100 comprises a side hollow chamber profile 401, which is laterally connected to the hollow chamber profile 101 and is disposed perpendicular to the connecting end of the respective bent section 1005-4 and formed integrally with the hollow chamber profile 101. The side hollow chamber profile 401 is reinforced by webs 403, 404. The side hollow chamber profile 401 is disposed at one end of the battery holder 100 and further comprises an approximately triangular hollow chamber 1013-1. In addition the battery holder 100 comprises a further side hollow chamber profile 1007, which is laterally connected to a further connecting end of the respective bent section 1005-5 and formed integrally with the hollow chamber profile 101. The further side hollow chamber profile 1007 is reinforced by webs 1009, 1011 and comprises a further triangular hollow chamber 1013-2.

Figure 11:
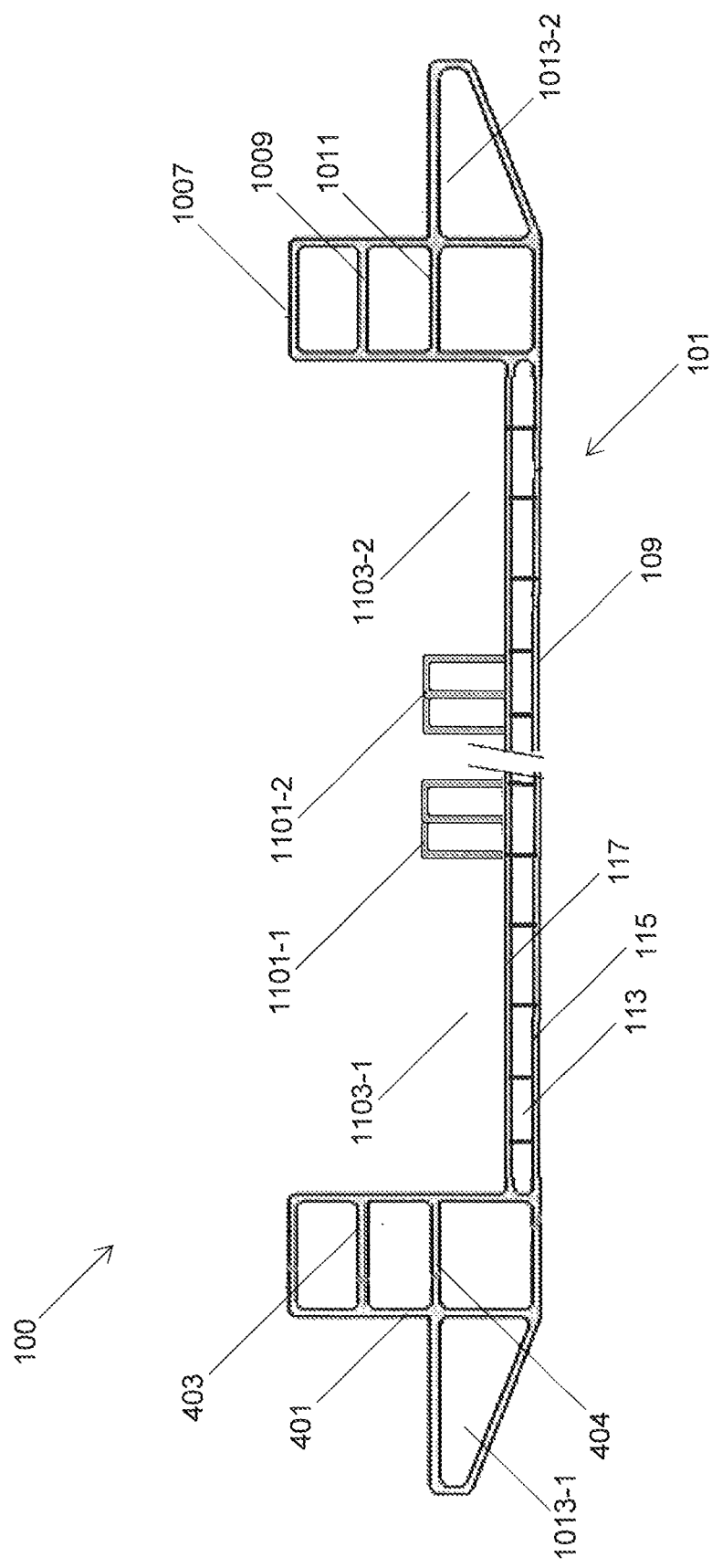
FIG. 11 shows a cross section of a battery holder.

FIG. 11 shows a cross sectional view of a schematic drawing of the battery holder 100. The section plane is disposed transverse to the longitudinal axis of the hollow channel 113. The battery holder 100 comprises a hollow chamber profile 101 with a heat exchanger structure 109. The heat exchanger structure 109 comprises a plurality of hollow channels 113, which extend parallel to one another and are defined by the first wall 115 and the second wall 117. The hollow channels 113 comprise a rectangular cross sectional area and are separated by rectilinear webs 1001 which connect the first wall 115 and the second wall 117. The battery holder 100 further comprises the side hollow chamber profile 401 with the reinforcement webs 403, 404 and the second side hollow chamber profile 1007, with the reinforcement webs 1009, 1011 according to the example shown in FIG. 10. The side hollow chamber profiles 401, 1007 each comprise an approximately triangular hollow chamber 1013-1, 1013-2.

The battery holder 100 comprises a plurality of juxtaposed module receptacles 1103-1, 1103-2 which are connected to the second wall 117 of the hollow chamber profile 101. Each module receptacle 1103-1, 1103-2 is provided for the receiving of a battery module. The module receptacles 1103-1, 1103-2 are separated from each other by separating walls 1101-1, 1101-2. The separating walls 1101-1, 1101-2 are integrally attached to the second wall 117 in the extension direction of the hollow channels 113.

LIST OF REFERENCE NUMBERS
100 battery holder
101 hollow chamber profile
103 hollow chamber
103-1 two partial hollow chamber
103-2 two partial hollow chamber
103-3 two partial hollow chamber
103-4 two partial hollow chamber
103-5 two partial hollow chamber
105 base wall
107 cover wall
109 heat exchanger structure
111 cover wall section
113 hollow channel
115 wall
117 wall
119 web
120 web
121 web
123 vertical
125 sidewall
126 sidewall
201-1 fastening tab
201-2 fastening tab
301 web
401 hollow chamber profile
403 web
405 web
801 longitudinal axis
803 molding tool
900 hollow channel profile
901 hollow channel
903 web
1001 rectilinear webs
1003-1 straight section
1003-2 straight section
1003-3 straight section
1003-4 straight section
1003-5 straight section
1005-1 bent section
1005-2 bent section
1005-3 bent section
1005-4 bent section
1005-5 bent section
1007 side hollow chamber profile
1009 web
1011 web
1013-1 triangular hollow chamber
1013-2 triangular hollow chamber
1101-1 separating wall
1101-2 separating wall
1103-1 module receptacle
1103-2 module receptacle

What is claimed is:

1. A battery holder for receiving at least one electric battery in a vehicle, comprising:
a hollow chamber profile with a hollow chamber comprising a base wall and a cover wall that is positioned opposite the base wall, wherein at least one web extends within the hollow chamber and joins the base wall with the cover wall, and wherein the at least one electric battery is configured for placement on the cover wall; and
a heat exchanger structure configured for tempering the at least one electric battery, wherein the heat exchanger structure is formed within a cover wall section of the cover wall and comprises a plurality of parallelly extending hollow channels that intersperse the cover wall section;
wherein the hollow chamber profile is an extruded metal profile that is integrally formed,
wherein the parallelly extending hollow channels are defined by openings formed at the front face of the cover wall section and are configured to be fluidly connected by pipe couplings inserted into the ends of the openings of the parallelly extending hollow channels, and
wherein an empty volume of the hollow chamber is larger than an empty volume of each single hollow channel of the plurality of parallelly extending hollow channels.

2. The battery holder according to claim 1, wherein each hollow channel has a slot-shaped cross section with a longitudinal axis extending within the cover wall section.

3. A battery holder for receiving at least one electric battery in a vehicle, comprising:
a first hollow chamber profile of a plurality of hollow chamber profiles, the first hollow chamber profile comprising a first hollow chamber comprising a first base wall and a first cover wall that is positioned opposite the base wall, wherein at least one web extends within the hollow chamber and joins the base wall with the cover wall, and wherein a first electric battery of the at least one electric battery is configured for placement on the first cover wall;
a first heat exchanger structure configured for tempering the electric battery, wherein the first heat exchanger structure is formed within a cover wall section of the first cover wall and comprises at least one hollow channel that intersperses the first cover wall;
a second hollow chamber profile of the plurality of hollow chamber profiles, the second hollow chamber profile comprising a second hollow chamber comprising a second base wall and a second cover wall, wherein a second electric battery of the at least one electric battery is configured for placement on the second cover wall; and
a second heat exchanger structure configured for tempering the second electric battery, wherein the second heat exchanger structure is formed within a cover wall section of the second cover wall and comprises a second hollow channel that intersperses the second cover wall,
wherein the first hollow chamber profile and the second hollow chamber profile are interconnected,
wherein the first hollow chamber profile and the second hollow chamber profile are extruded metal profiles that are integrally formed,
wherein the plurality of hollow chamber profiles comprise a frame that circumferentially defines the at least one electric battery, and wherein an empty volume of the first hollow chamber and an empty volume of the second hollow chamber are each larger than an empty volume of each single hollow channel of the plurality of parallelly extending hollow channels.

4. The battery holder according to claim 3, wherein each hollow channel has a slot-shaped cross-section with a longitudinal axis extending within the cover wall section.

5. The battery holder according to claim 1, wherein each hollow channel is intersperseable with a heat conducting fluid that tempers the at least one electric battery.

6. The battery holder according to claim 1, wherein the at least one hollow channel of the cover wall section is defined by a first wall that faces the base wall and a second wall that faces the at least one electric battery, and wherein the second wall has a greater wall thickness than the first wall to achieve a homogeneous temperature curve in the cover wall section.

7. The battery holder according to claim 1, wherein the cover wall section has a greater wall thickness than the base wall.

8. The battery holder according to claim 1, wherein:
the at least one web joins the base wall and the cover wall along a vertical; or
the at least one web is disposed perpendicular to the base wall or perpendicular to the cover wall.

9. The battery holder according to claim 1, wherein each web of the at least one web are formed curvedly in a cross section.

10. The battery holder according to claim 1, wherein the at least one web and a second web divide the hollow chamber into two partial hollow chambers.

11. The battery holder according to claim 1, further comprising:
a second hollow chamber profile with a second hollow chamber that is defined by a second base wall and a second cover wall, wherein a second electric battery is configured for placement on the cover wall.

12. The battery holder according to claim 11, wherein the hollow chamber profile and the second hollow chamber profile are interconnected integrally or in a formfitting manner.

13. The battery holder according to claim 1, wherein each hollow channel forms a fluid-carrying conduit.

14. The battery holder according to claim 1, wherein fastening tabs configured for coupling with a second hollow chamber profile are laterally disposed of the hollow chamber profile.

15. The battery holder according to claim 1, further comprising:
a side hollow chamber profile configured to laterally connect to the hollow chamber profile, wherein the side hollow chamber profile is disposed perpendicular to the hollow chamber profile.

16. The battery holder according to claim 15, wherein the side hollow chamber profile is formed integrally with the hollow chamber profile.

* * * * *